US008780378B2

(12) United States Patent
Yamamoto

(10) Patent No.: US 8,780,378 B2
(45) Date of Patent: Jul. 15, 2014

(54) INSPECTION APPARATUS, INSPECTION METHOD, INSPECTION SYSTEM, AND STORAGE MEDIUM

(71) Applicant: Canon Kabushiki Kaisha, Tokyo (JP)

(72) Inventor: Naohiro Yamamoto, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 13/668,020

(22) Filed: Nov. 2, 2012

(65) Prior Publication Data
US 2013/0114102 A1 May 9, 2013

(30) Foreign Application Priority Data

Nov. 8, 2011 (JP) .................................. 2011-244175

(51) Int. Cl.
*G06K 15/00* (2006.01)
*H04N 1/193* (2006.01)
(52) U.S. Cl.
CPC ..................................... *H04N 1/193* (2013.01)
USPC ........................... 358/1.14; 358/1.12; 358/496
(58) Field of Classification Search
USPC .................. 358/1.14, 504, 496, 1.12
See application file for complete search history.

(56) References Cited

U.S. PATENT DOCUMENTS

| 8,384,960 | B2* | 2/2013 | Tanaka | 358/3.21 |
|---|---|---|---|---|
| 8,639,135 | B2* | 1/2014 | Okada | 399/39 |
| 2005/0007404 | A1* | 1/2005 | Usui | 347/14 |
| 2009/0086244 | A1* | 4/2009 | Matoba | 358/1.13 |
| 2010/0309525 | A1* | 12/2010 | Tanaka | 358/3.21 |
| 2011/0228350 | A1* | 9/2011 | Wakaura | 358/474 |
| 2012/0042827 | A1* | 2/2012 | Kojima | 118/699 |

FOREIGN PATENT DOCUMENTS

| JP | 2007-085870 A | 4/2007 |
|---|---|---|
| JP | 2008-197917 A | 8/2008 |

* cited by examiner

*Primary Examiner* — Jerome Grant, II
(74) *Attorney, Agent, or Firm* — Canon U.S.A., Inc. IP Division

(57) ABSTRACT

There is provided an inspection apparatus. When the inspection apparatus inspects a printed product, whether positional alignment of a print image obtained by reading the printed product and a reference image is to be performed is determined, and in a case where it is determined that the positional alignment is to be performed, the positional alignment is performed and an inspection based on a comparison of the print image and the reference image is executed, and in a case where it is determined that the positional alignment is not to be performed, an inspection based on a number of feature points of the print image is executed.

14 Claims, 17 Drawing Sheets

FIG.9
ALIGN PIXEL POSITIONS OF EDGE PORTIONS
REFERENCE IMAGE                     PRINT IMAGE
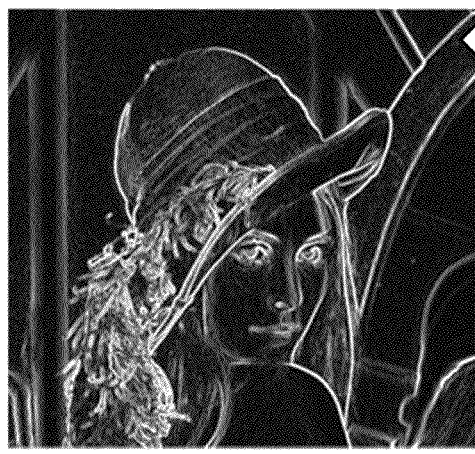 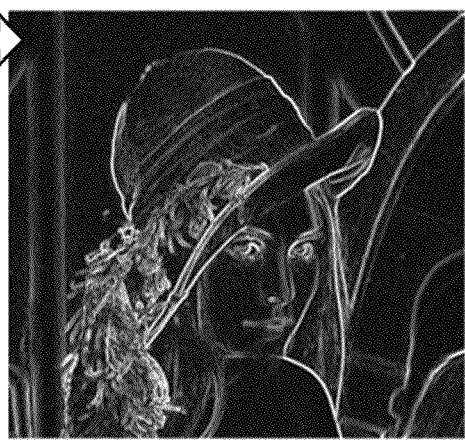

PRINT IMAGE

BLOCK IMAGE

REFERENCE IMAGE  *901*

*902*

PRINT IMAGE
COMPARED TO
IMAGE IN FIG. 10C

REFERENCE IMAGE

PRINT IMAGE

INSPECTION APPARATUS, INSPECTION METHOD, INSPECTION SYSTEM, AND STORAGE MEDIUM

BACKGROUND OF THE INVENTION

1. Field of the Invention

The present invention relates to an inspection apparatus, an inspection method, an inspection system, and a storage medium. More particularly, the present invention relates to an inspection apparatus, an inspection method, an inspection system, and a storage medium useful for inspecting a printed product having an image printed thereon.

2. Description of the Related Art

Conventionally, there have been a print image inspection system which determines (inspects) whether a printed product has a defect. This system can be used for a printing and bookbinding system such as a Print on Demand (POD) apparatus. As a method for inspecting a printed product, there is a method in which an image input in a printing apparatus (also referred to as a reference image) is compared with an image of a printed product output from the printing apparatus and read by a reading apparatus such as a scanner (also referred to as a print image).

According to a method discussed in Japanese Patent Application Laid-Open No. 2007-085870, if there is misregistration of the images, a comparison inspection of the images is performed after the positional alignment of the images are performed.

Further, Japanese Patent Application Laid-Open No. 2008-197917 discusses a positional alignment method of a reference image and a print image by extracting feature points, such as an edge, from both the reference image and the print image, and performing geometric transformation of the images after detecting a correspondence relation of the feature points extracted from the images.

As discussed in Japanese Patent Application Laid-Open No. 2007-085870, it is necessary to perform the positional alignment of the images in accurately comparing the reference image and the print image. The positional alignment method discussed in Japanese Patent Application Laid-Open No. 2008-197917 performs the positional alignment of the images based on the feature points which are extracted from edge information of a line or a character in the image.

However, the feature points cannot be extracted or, even if they are extracted, the number of the extracted feature points may be extremely small depending on the image that is processed. In such a case, even if the positional alignment processing is performed for the reference image and the print image, the accuracy of the positional alignment may be low. For example, if the reference image is a gradation image, an edge, from which the feature points are extracted, may not be obtained. Further, for example, if the reference image is a natural picture, the number of the edges which can be extracted may be extremely small. In such a case, the number of the feature points which are extracted may not be sufficient for performing high-precision positional alignment.

If comparison processing with the positional alignment processing being required is performed with respect to a reference image and a print image which are not suitable for high precision positional alignment, a good printed product maybe determined as defective due to low positional alignment accuracy.

SUMMARY OF THE INVENTION

According to an aspect of the present invention, an inspection apparatus configured to inspect a printed product by comparing a print image acquired by reading the printed product and a reference image, includes a determination unit configured to determine whether positional alignment of the reference image and the print image for comparison is to be performed based on a feature of the reference image, and an inspection unit configured to execute an inspection based on comparison of the reference image and the print image after performing the positional alignment if execution of the positional alignment is determined as acceptable by the determination unit and execute an inspection based on a number of feature points of the print image if the execution of the positional alignment is determined as not acceptable by the determination unit.

According to the present invention, a printed product, which is printed based on a reference image that does not include sufficient number of feature points necessary in high-precision positional alignment, can be efficiently inspected.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates positional alignment processing.

DESCRIPTION OF THE EMBODIMENTS

Various exemplary embodiments, features, and aspects of the invention will be described in detail below with reference to the drawings.

Figure 1:
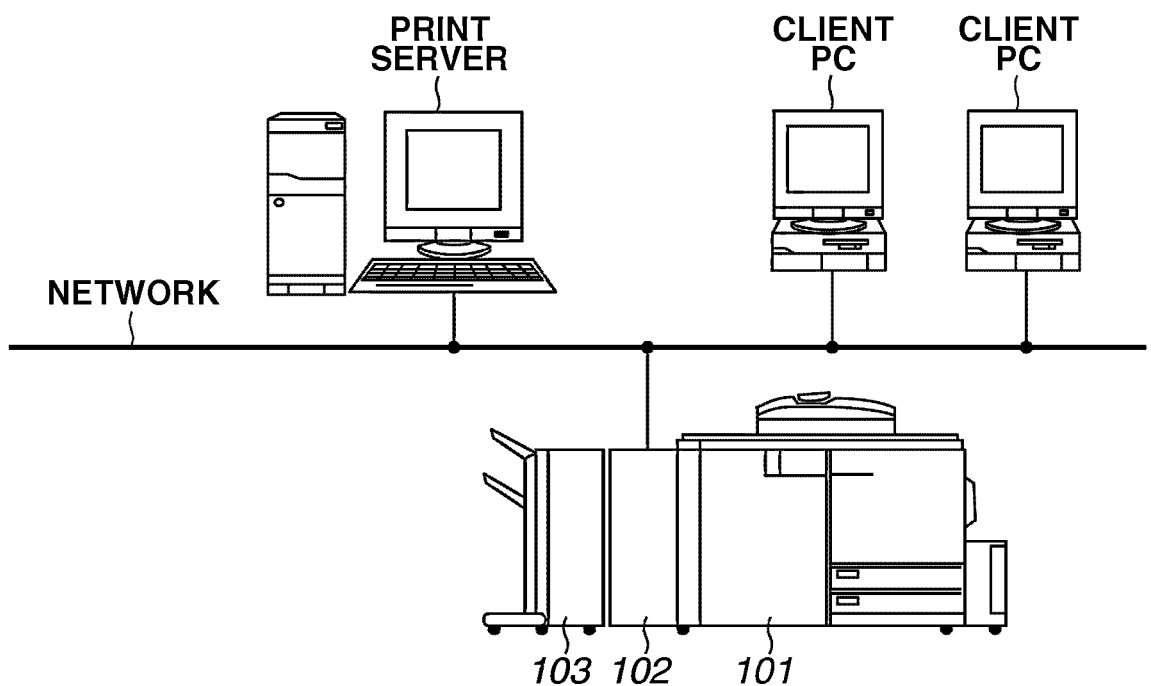
FIG. 1 illustrates a system configuration.

FIG. 1 illustrates a configuration example of an inspection system including an inspection apparatus 102 according to an exemplary embodiment of the present invention.

An image forming apparatus 101 processes various types of input data, executes print processing, and outputs a printed product. The printed product can be a sheet-type product such as print paper (sheet). The inspection apparatus 102 receives the printed product output from the image forming apparatus 101 and inspects the content of the output. A finisher 103, which is a post-processing apparatus, receives the printed product inspected by the inspection apparatus 102.

The image forming apparatus 101 is connected to a print server or a client PC via a network. The client PC transmits a print job to be printed to the image forming apparatus 101 via the network. The print server manages the print job so that the image forming apparatus can be shared among a plurality of client PCs via the network.

The inspection apparatus 102 is connected one-on-one to the image forming apparatus 101 via a communication cable and performs transmission/reception of information. Further, the finisher 103 is connected one-on-one to the image forming apparatus 101 via a communication cable different from the above-described communication cable. The system including the inspection apparatus according to the present exemplary embodiment is realized by an in-line inspection apparatus which seamlessly performs image forming, image inspection, and finishing.

Figure 2:
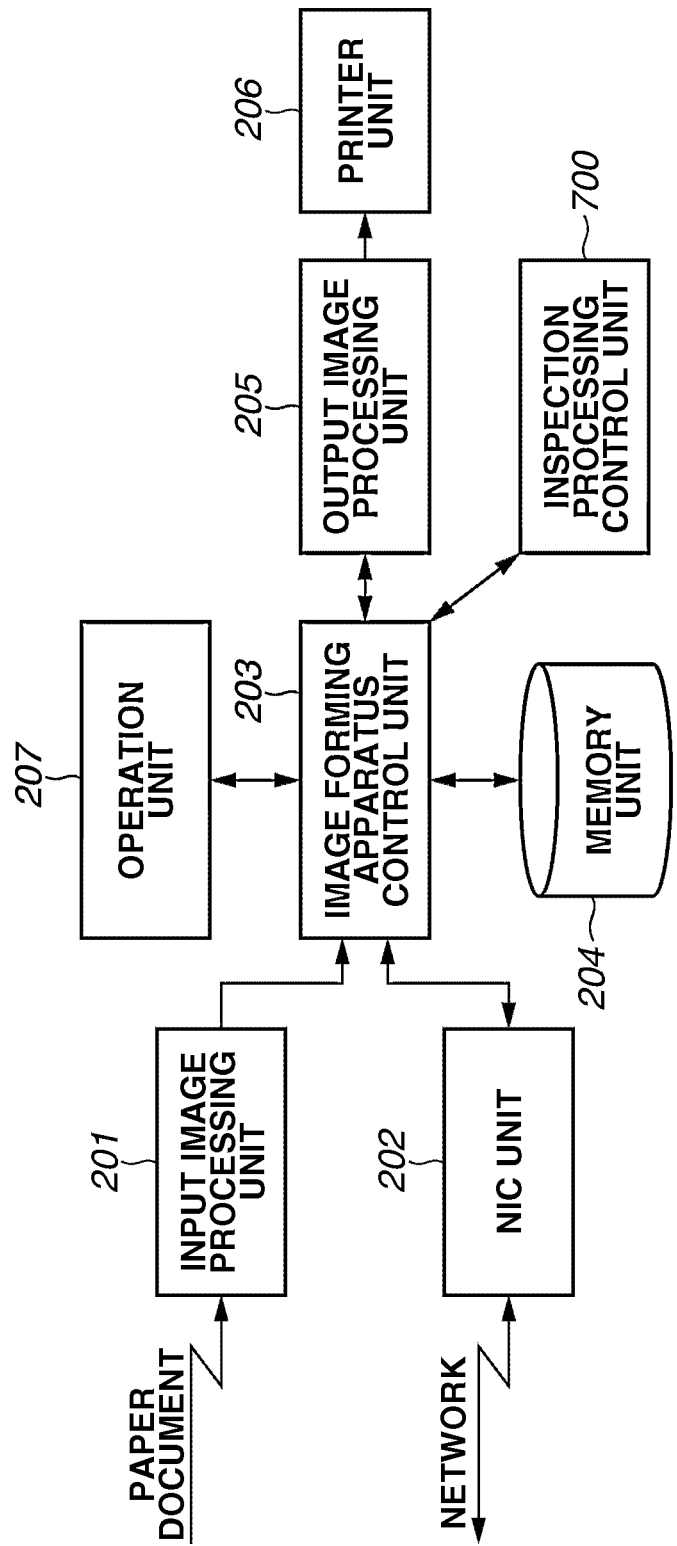
FIG. 2 is a block diagram illustrating processing units of an image forming apparatus.

The configuration of each processing unit relating to the print processing and included in the image forming apparatus 101 will be described with reference to FIG. 2.

Regarding the print processing, with respect to a print job which has been input from the printer server via the network, units used for the print job are controlled so that the units concerning scanning, laser exposure, imaging, fixing, and paper feeding/conveying are managed in harmony. In FIG. 2, an input image processing unit 201 reads a paper document by an image reading device, such as a scanner, and performs image processing on the obtained image data.

A network interface card (NIC) unit 202 transmits image data (mainly, page description language (PDL) data) input via the network to a raster image processor (RIP) unit, or transmits image data in the image forming apparatus or apparatus information to an external device via the network. The raster image processor (RIP) unit decodes the code of the input PDL data to generate a raster image.

The image data input by the input image processing unit 201 or the NIC unit 202 is transmitted to an image forming apparatus control unit 203. The image forming apparatus control unit 203 controls the input data and the output data. Image data input in the image forming apparatus control unit 203 is temporarily stored in a memory unit 204. The stored image data is used as needed.

Figure 7:
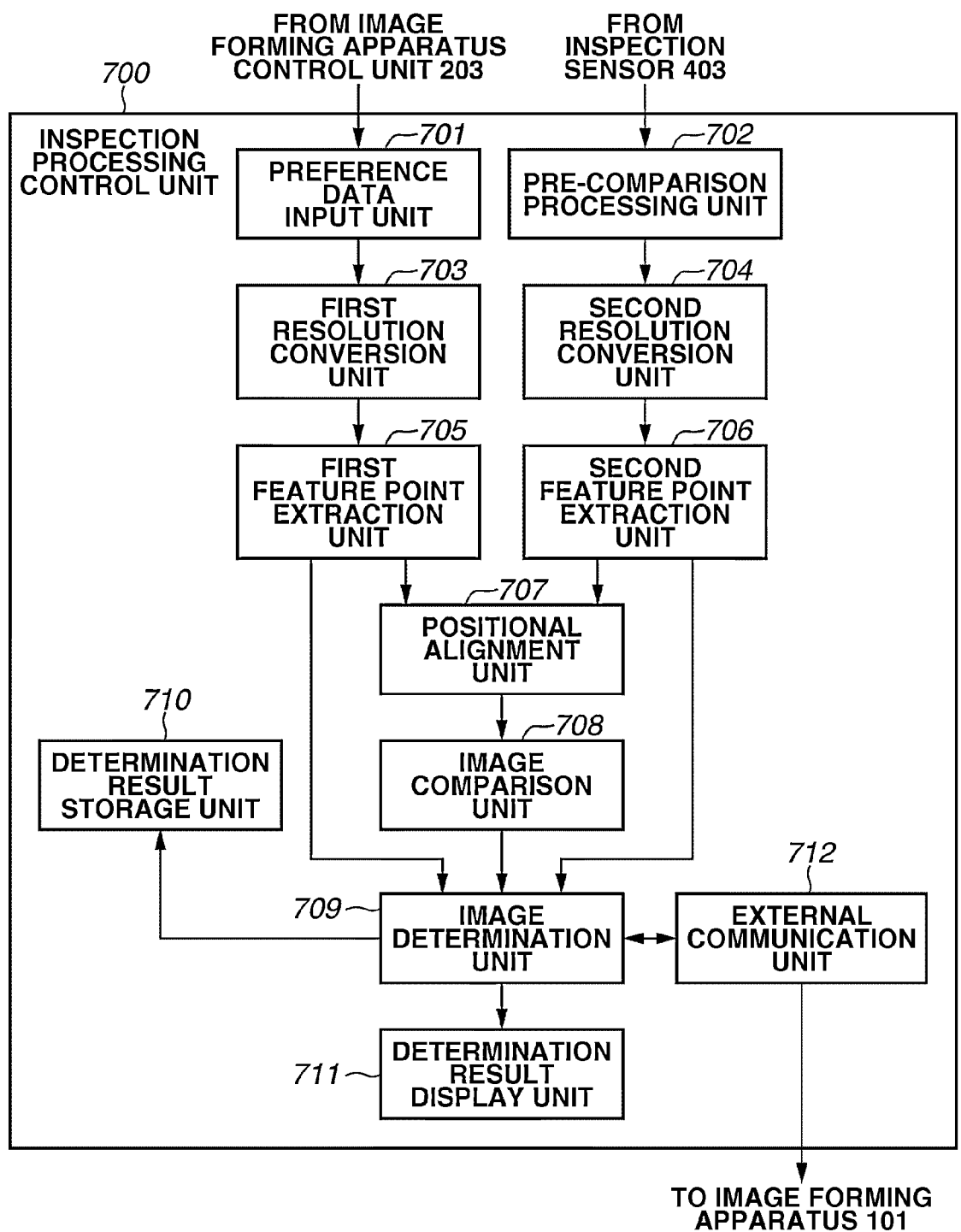
FIG. 7 is a block diagram illustrating processing units of the inspection apparatus.

Further, the image forming apparatus control unit 203 is connected to an inspection processing control unit 700 illustrated in FIG. 7, and performs transmission/reception of information necessary in the inspection processing. With respect to a printed product printed by the image forming apparatus 101, the image forming apparatus control unit 203 performs transmission/reception of timing information of the print output, data of the reference image, information of a setting value necessary in the inspection, and the result of the inspection processing so that the inspection processing can be executed by the inspection apparatus 102.

An output image processing unit 205 performs image processing for print output on the image data, and transmits image data to a printer unit 206 after the image processing. The printer unit 206 feeds a sheet-type recording medium (hereinafter simply referred to as a sheet), and sequentially prints the image data generated by the output image processing unit 205 on the sheet.

In the following description, a sheet is a recording medium which is printed by the image forming apparatus 101. The sheet is, for example, thick print paper or an overhead projector (OHP) sheet. An operation unit 207 is used when a user selects functions such as scanning and printing, determines a discharge method of the sheet, and sets a first extraction level, a second extraction level, a pixel comparison level, or a block comparison level regarding the inspection described below.

Figure 3:
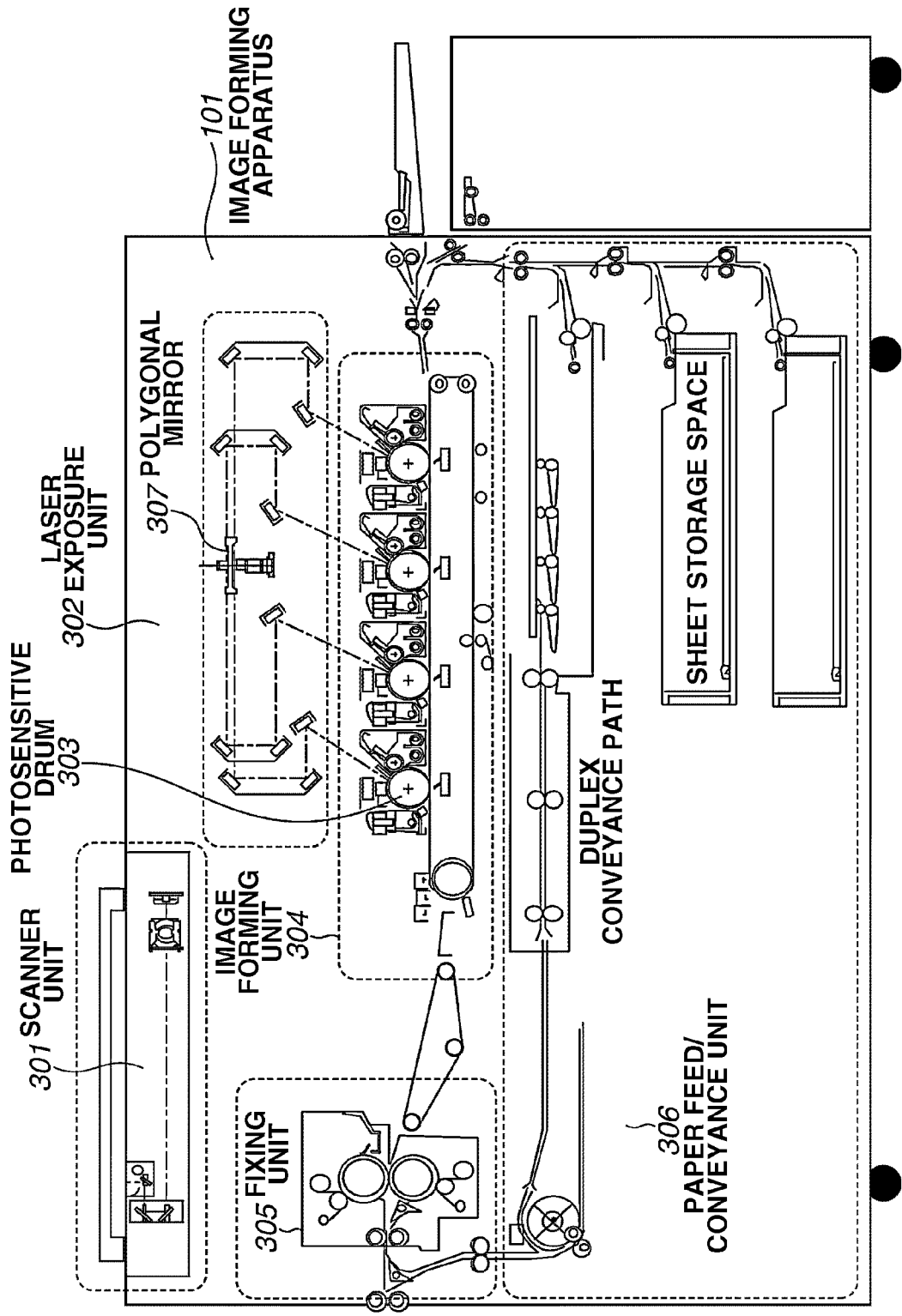
FIG. 3 illustrates a configuration of the image forming apparatus.

FIG. 3 illustrates an inner configuration of the image forming apparatus 101.

The image forming apparatus 101 includes a scanner unit 301, a laser exposure unit 302, a photosensitive drum 303, an imaging unit 304, a fixing unit 305, a paper feed/conveyance unit 306, and the printer control unit that controls these units and described above with reference to FIG. 2.

The scanner unit 301 illuminates a document placed on a document positioning plate to optically scan the document image, converts the image into an electric signal, and forms image data.

The laser exposure unit 302 directs a light beam, such as a laser beam, which is modulated according to the image data, to a polygonal mirror 307 which rotates at a constant angular speed. The light reflected from the polygonal mirror 307 is emitted to the photosensitive drum 303 as scanning light.

The image forming unit 304 is configured to form an image by a series of electrophotographic processes including rotating the photosensitive drum 303, applying an electric charge on the photosensitive drum 303 by a charging unit, developing a latent image formed on the photosensitive drum 303 by the laser exposure unit with toner, and transferring the toner image to a sheet. The image forming unit 304 also recovers a minute amount of toner that remains untransferred on the photosensitive drum 303. Image formation is realized by four developing units (developing stations) of the above-described series of electrophotographic processes.

The four developing units are arranged in the order of cyan (C), magenta (M), yellow (Y), and black (K). Magenta, yellow, and black image forming operations are sequentially executed after a predetermined time from the start of the image formation of the cyan station. With this timing control, a full-color toner image without color misregistration is transferred onto a sheet. Although a color printer is used in the present exemplary embodiment, a monochrome printer can also be used. If a monochrome printer is used, only the black developing unit is used.

The fixing unit 305 includes a combination of rollers and belts and a heat source such as a halogen heater. The fixing unit 305 applies heat and pressure to melt and fix the toner which is transferred to the sheet.

The paper feed/conveyance unit 306 includes at least one paper storage space represented by a paper cassette or a paper deck. According to an instruction from the printer control unit, one sheet out of a plurality of sheets stored in the paper storage space is separated and conveyed to the image forming unit 304 and the fixing unit 305. A toner image of each color is transferred to the conveyed sheet by the above-described developing stations so that a full-color toner image is finally formed on the sheet. Further, for forming images on both sides of the sheet, the sheet which passed through the fixing unit 305 is controlled and conveyed to the image forming unit 304 again through a two-sided conveyance path. The image-formed sheet is conveyed to the inspection apparatus 102.

Figure 5:
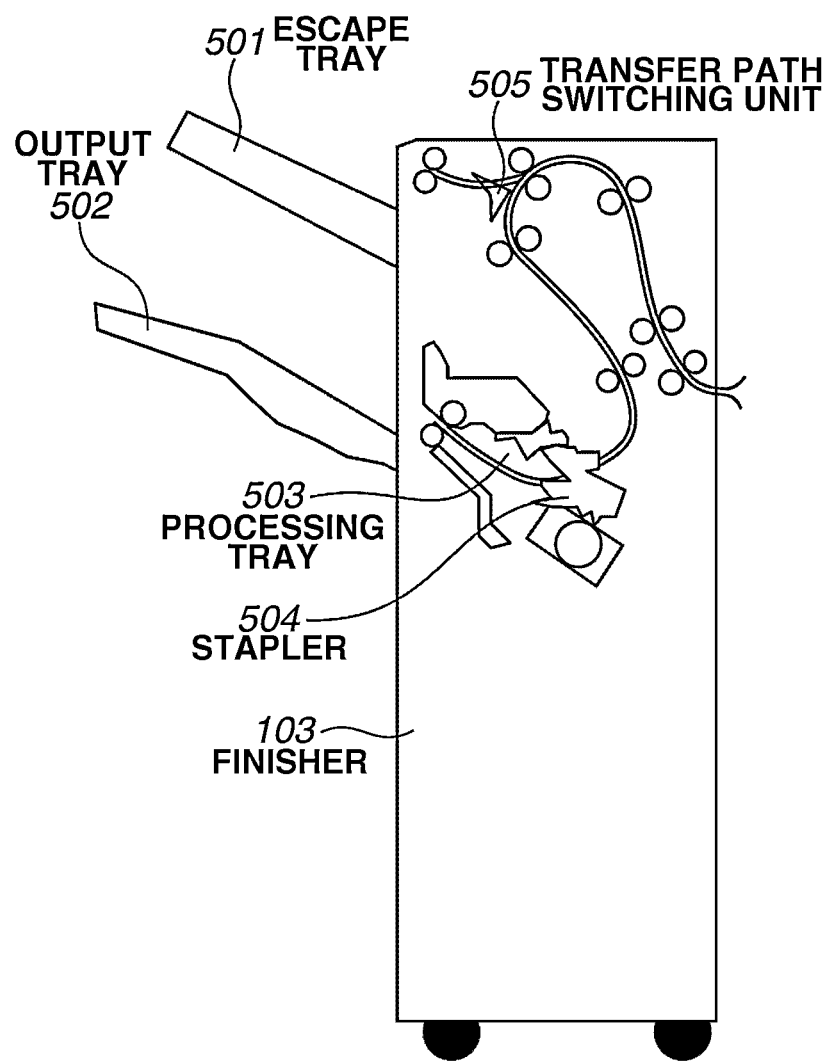
FIG. 5 illustrates a configuration of a finisher.

FIG. 5 is a cross sectional view of an example of a configuration of the finisher 103.

The sheet discharged from the inspection apparatus 102 is conveyed to the finisher 103. The finisher 103 includes an escape tray 501 and an output tray 502. The discharge destination of the printed product is changed according to the setting through the operation unit 207 set by the user and the result of the inspection performed by the inspection apparatus 102.

A printed product which is determined as a defective print or not determined as a good print according to the inspection performed by the inspection apparatus 102 is discharged on the escape tray 501.

Further, if a staple mode is set for the job, the printed products are discharged on the output tray 502. To be more precise, before the printed products are discharged on the output tray 502, they are sequentially accumulated on a processing tray 503 in the finisher for each job, and stapled by a stapler 504 on the processing tray 503. Then the stapled printed products are discharged onto the output tray 502.

A transfer path switching unit 505 changes the transfer path of the sheet according to inspection determination information acquired from the inspection apparatus 102 and user setting set via the operation unit 207. When the transfer path is changed, the sheet can be transferred to the escape tray 501 or the output tray 502.

Figure 6:
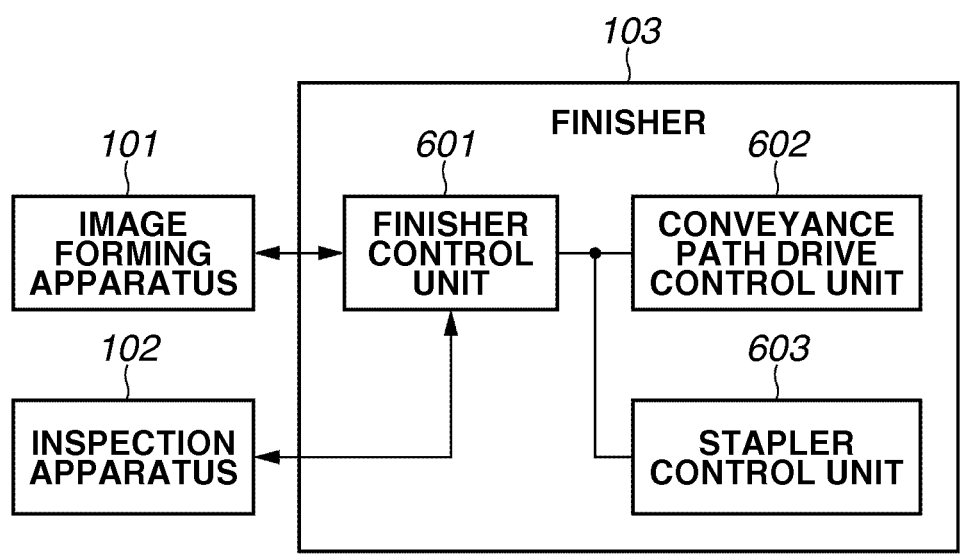
FIG. 6 is a block diagram illustrating control units of the finisher.

FIG. 6 is a block diagram illustrating a configuration of the finisher 103 including control units that perform the discharge control of the sheet after the inspection result has been obtained.

A finisher control unit 601 in the finisher 103 is connected to the image forming apparatus control unit 203 in the image forming apparatus 101 and the inspection processing control unit 700 in the inspection apparatus 102.

The finisher control unit 601 receives finisher setting information corresponding to the job from the image forming apparatus control unit 203 and communicates with each control unit configured to control each function of the finisher 103 based on the received setting information. The finisher setting information sent from the image forming apparatus control unit 203 includes control information of the discharge destination of the printed product which is based on the inspection result of the inspection apparatus 102.

Regarding the selection of the discharge destination of the sheet, the image forming apparatus control unit 203 performs the discharge destination setting of the finisher. The discharge destination setting is based on the setting set by the user via the operation unit 207.

A conveying path drive control unit 602 conveys the printed product to various finishing units based on job control information transmitted from the finisher control unit 601. For example, if the printed product requires stapling, the conveying path drive control unit 602 communicates with a stapler control unit 603. Then, the finisher control unit 601 receives status information of the stapler control unit 603 from the stapler control unit 603 and transmits job control information. Then, a stapling operation according to the content of the job is performed and the stapled printed product is output.

Figure 4A:
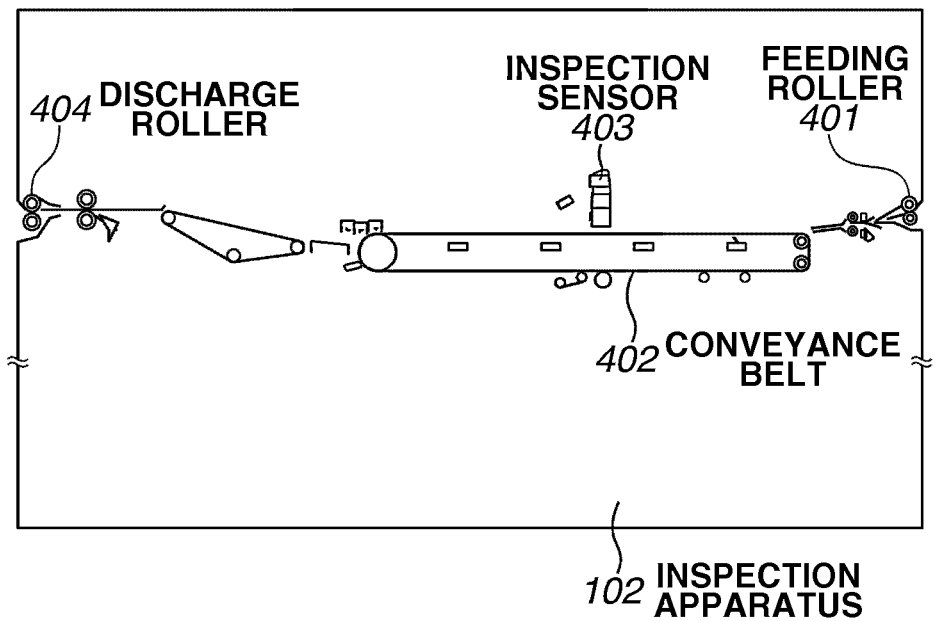
FIGS. 4A and 4B illustrate a configuration of an inspection apparatus.

FIG. 4A illustrates a printed product conveyed inside the inspection apparatus 102. The printed product output from the image forming apparatus 101 is conveyed to the inspection apparatus 102 by a feeding roller 401. Then, the image of the printed product is read by an inspection sensor 403, which is provided above a conveying belt 402, while the printed product is conveyed by the conveying belt 402, and the inspection determination is performed.

The result of the determination is transmitted to the finisher 103. After the determination is performed, the printed product is output by a discharge roller 404. Although not illustrated, the inspection sensor 403 can also include an inspection sensor provided under the conveying belt 402 so that a two-sided printed product can be inspected.

Figure 4B:
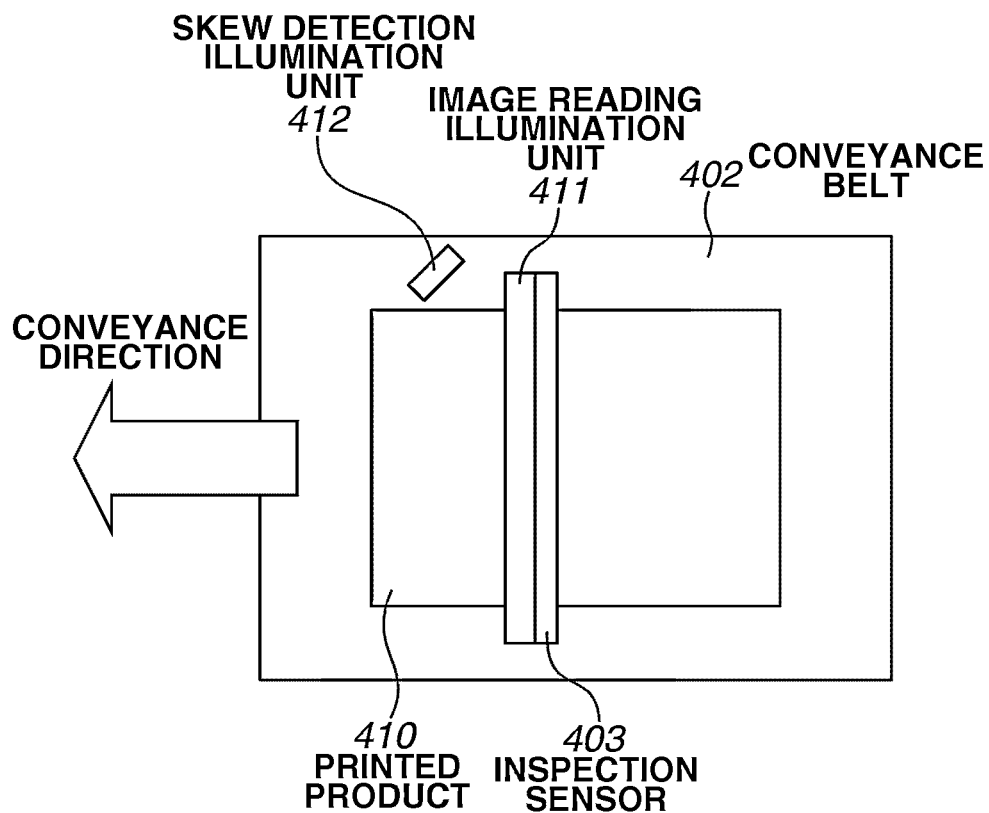

FIG. 4B is an example of a top view of a portion of the above-described conveying belt 402. The inspection sensor 403 reads line-by-line the whole image of a printed product 410, which has been conveyed as illustrated. An image reading illumination unit 411 illuminates the printed product when the inspection sensor 403 reads the printed product.

A skew detection illumination unit 412 detects whether the printed product is skewed with respect to the conveying direction of the printed product when the printed product is conveyed by the conveying belt 402. By the skew detection illumination unit 412 illuminating the printed product which is conveyed from an oblique direction, a shadow of an edge of the printed product is detected and thus the skew is detected. Although the shadow of the edge of the printed product is detected by the inspection sensor 403 according to the present exemplary embodiment, it can be detected by a reading sensor other than the inspection sensor 403.

FIG. 7 illustrates a configuration of the inspection processing control unit 700 in the inspection apparatus 102. The inspection processing control unit 700 controls the operation of the inspection apparatus 102. Further, the inspection processing control unit 700 includes a central processing unit (CPU), a read-only memory (ROM), a random access memory (RAM), and a hard disk drive (HDD) (not illustrated). The ROM is a non-volatile memory. A program used for executing processing in a flowchart in FIG. 17 described below is stored in this ROM.

Figure 17:
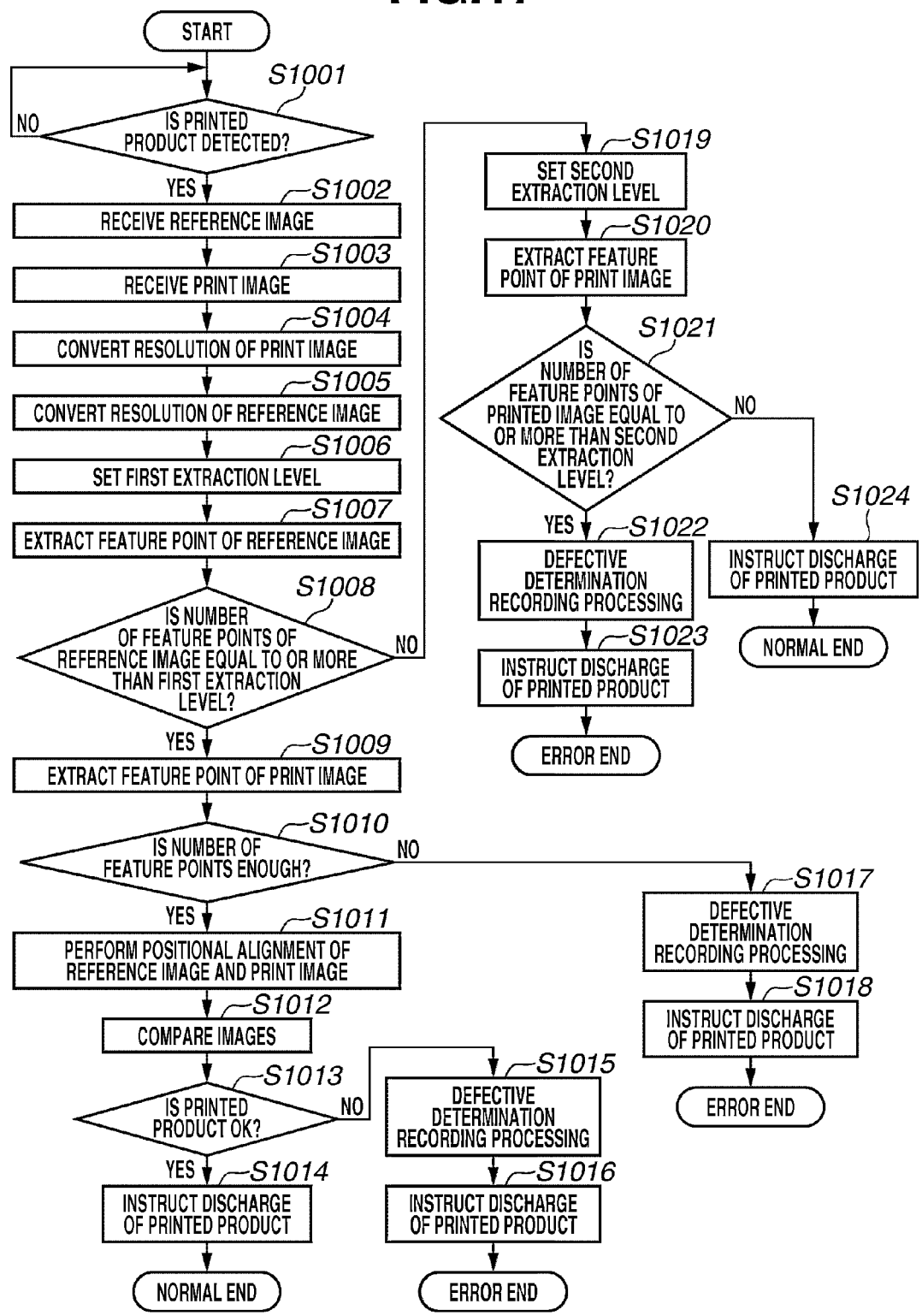
FIG. 17 is a flowchart illustrating inspection determination processing.

The CPU loads the program from the ROM into the RAM and executes the program. The processing of the flowchart in FIG. 17 is executed in this manner. Further, by the CPU executing the program, the inspection processing control unit 700 functions as each processing unit illustrated in FIG. 7.

In step S1001, a reference data input unit 701 determines whether a printed product is detected. If a printed product is detected (YES in step S1001), the processing proceeds to step S1002. In step S1002, the reference data input unit 701 receives a reference image from the image forming apparatus control unit 203.

In step S1003, a comparison pre-processing unit 702 receives a print image from the inspection sensor 403 and performs various types of pre-processing on the received image. The processing is, for example, skew correction processing, halftone smoothing processing, color correction processing, edge enhancement processing, and binarization processing. When the color correction processing is performed, color correction of a reading device of the inspection sensor 403 is performed, and the data is converted into data in a standard color space. Content of such pre-processing can be changed according to the required accuracy of the inspection.

In step S1004, a second resolution conversion unit 704 performs conversion processing of the print image processed by the comparison pre-processing unit 702 so that the resolution of the image necessary for the image determination is obtained. In step S1005, a first resolution conversion unit 703 performs conversion processing of the reference image received from the reference data input unit 701 so that resolution of the image necessary for the image determination is obtained.

A first feature point extraction unit 705 performs extraction processing of the feature points from a reference image which has undergone the resolution conversion by the first resolution conversion unit 703 in steps S1006 to S1010 described below. A second feature point extraction unit 706 performs extraction processing of the feature points with respect to a print image which has undergone the resolution conversion by the second resolution conversion unit 704 in steps S1019 to S1021 described below. The positions of the feature points extracted by the first feature point extraction unit 705 and the second feature point extraction unit 706 are stored as feature point information. The first feature point extraction unit 705 and the second feature point extraction unit 706 may sometimes be collectively called an extraction unit.

Figure 8:
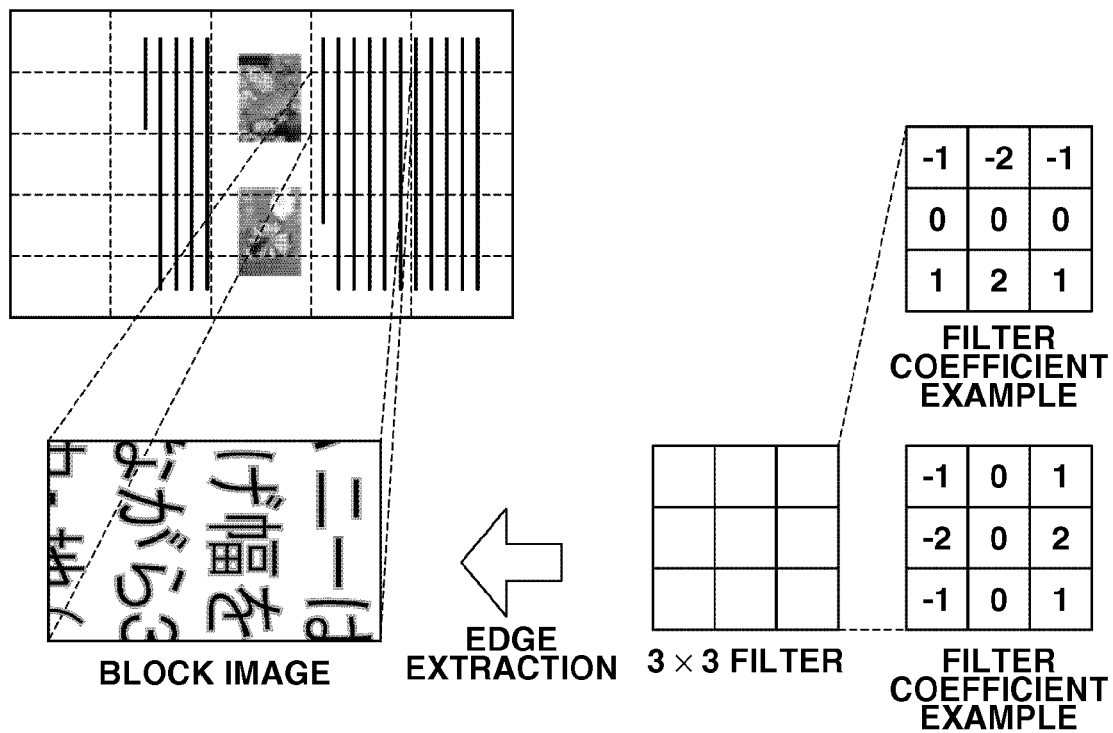
FIG. 8 illustrates extraction processing of a feature point.

The extraction of the feature points of the images will be described with reference to FIG. 8. According to the setting set by the user via the operation unit 207, the number of the feature points extracted by the first feature point extraction unit 705 and the second feature point extraction unit 706 as well as the position information of the feature points can be presented to the user. By displaying the result of the extraction of the feature points to the user, an inspection accuracy indicator is presented.

In step S1011, in order to compare the reference image and the print image, a positional alignment unit 707 performs positional alignment of the reference image and the print image using the position information of each feature point extracted by the first feature point extraction unit 705 and the second feature point extraction unit 706.

In performing positional alignment of the images with appropriate positional alignment accuracy, the reference image and the print image are generally required to have sufficient information of the feature points (number information, position information, etc.) necessary in the positional alignment of the images. For example, the number of the feature points extracted from the reference image needs to be equal to or more than the first extraction level (described below) set by the user via the operation unit 207.

If the information of the feature points extracted from the reference image by the first feature point extraction unit 705 does not reach the first extraction level set by the user via the operation unit 207, the positional alignment unit 707 does not perform the positional alignment processing. If the information of the feature points extracted from the reference image by the first feature point extraction unit 705 reaches the first extraction level set by the user via the operation unit 207, the positional alignment unit 707 performs the positional alignment processing. Such processing will be described below with reference to FIG. 9.

In step S1012, an image comparison unit 708 performs the image comparison using the pixels of the reference image and the print image which have been aligned by the positional alignment unit 707. This image comparison is performed by using a comparison level set by the user via the operation unit 207. There are two types of comparison levels. One is a block comparison level and the other is a pixel comparison level. Either of them can be set by the user via the operation unit 207.

The block comparison level is information used for OK/NG determination of each pixel block in a print image. It is also information indicating to what extent an NG pixel of a pixel block is tolerated. Details of this processing will be described below with reference to FIGS. 10A to 10D. Further, the pixel comparison level is information used for OK/NG determination of each pixel. It is also information used for detecting an NG pixel (defective pixel) which is used when the reference image and the print image are compared by the pixel unit. Details of this processing will be described below with reference to FIGS. 10A to 10D.

An image determination unit 709 performs the OK/NG determination (inspection) of the printed product based on a result of the comparison performed by the image comparison unit 708 and an extraction result of the feature points from the print image, and performs processing according to the determination result in steps S1013 to S1018 and steps S1022 to S1024. For example, based on the determination result of the printed product, the image determination unit 709 performs defective determination recording processing. Processing in steps S1013 to S1018 and steps S1022 to S1024 will be described below in detail.

The defective determination recording processing is performed when the printed product is determined as defective. The defective determination recording processing according to the present exemplary embodiment is processing by the image determination unit 709 recording page order information of the printed product which has been determined as defective and the content of such printed product in a determination result recording unit 710 as a result of the determination.

The determination result to be recorded includes the number of times the printed product has been determined as defective. The determination result is used as a database of the inspection results. Further, the defective determination recording processing includes processing which the image determination unit 709 instructs a determination result display unit 711 to display the database of the inspection results.

The image determination unit 709 transmits an image forming operation stop request to the image forming apparatus 101 via an external communication unit 712 if the printed product is continuously determined as defective or if the number of times the printed product has been determined as defective is equal to or greater than a predetermined number of times when the database of the inspection result is used as a reference. In other words, by using the history of the inspection result, the image determination unit 709 determines whether the possibility of continuous occurrence of the defective image forming (printing) by the image forming apparatus 101 is high, and controls the print image forming operation (print processing) performed by the image forming apparatus 101.

Transmission processing of the stop request of the image forming operation is also included in the defective determination recording processing. If this stop request of the image forming operation is notified, out of the print jobs sent from printer server and accepted by the image forming apparatus 101, the image forming apparatus 101 discharges the sheet which is printed at that time and stops the print processing. Further, the image forming apparatus 101 stops accepting print jobs from the printer server.

Next, the method for extracting the feature points performed by the first feature point extraction unit 705 and the second feature point extraction unit 706 in steps S1006 to S1010 and the positional alignment method performed by the positional alignment unit 707 in step S1011 will be described in detail with reference to FIGS. 8 and 9.

The extraction of the feature points used in the positional alignment of the images is performed by the first feature point extraction unit 705 and the second feature point extraction unit 706. According to the present exemplary embodiment, although an edge or an isolated point of a character or a photograph is extracted as a feature point, a pixel or an image having other features can also be used as a feature point.

First, the feature points extracted according to the present exemplary embodiment will be described. According to the extraction example of the feature points of the image illustrated in FIG. 8, the image is divided into a plurality of blocks. Then, edge enhancement filter processing is performed with respect to the divided blocks. Further, binarization processing is performed on the image after the filter processing. According to the present exemplary embodiment, a 3×3 filter will be applied to the block image. The filter has a differential coefficient used as a filter factor for determining the edge detection.

The first feature point extraction unit 705 and the second feature point extraction unit 706 perform such processing on the reference image and the print image to obtain an edge image as the one illustrated in FIG. 9. According to the present exemplary embodiment, the edge image (white pixel portions in FIG. 9) is extracted as the feature points.

According to the present exemplary embodiment, with respect to the edge image, a lump of white pixels, in other words, a plurality of edge pixels (edge joined pixels) of a joined number greater than a predetermined number are regarded as one feature point. Thus, the first feature point extraction unit 705 and the second feature point extraction unit 706 compares the joined number of the white pixels with the predetermined threshold value so that a few lump of white pixels are not regarded as a feature point. In other words, if the joined number of the white pixels is equal to or greater than a predetermined threshold value, the white pixels are extracted as a feature point.

For example, if the joined number of the white pixels is 20 and the threshold value is 10, the joined white pixels are extracted as a feature point. On the other hand, if the threshold value is 30, the joined white pixels are not extracted as a feature point. The threshold value can be set as appropriate.

By performing the extraction processing of the feature points described above, the first feature point extraction unit 705 extracts feature points from the reference image in step S1007, and the second feature point extraction unit 706 extracts feature points from the print image in step S1009. The feature point extraction processing of the print image described below in step S1020 also extracts feature points by similar processing.

Next, the first extraction level will be described. The first extraction level is used for determining the characteristics of the image regarding the feature point. According to the present exemplary embodiment, the first extraction level is set in step S1006 before the feature point extraction processing in step S1007.

According to the present exemplary embodiment, the first feature point extraction unit 705 counts the number of joined white pixels of a joined number that exceeds a predetermined threshold value with respect to an edge image of the reference image, and compares the number of joined white pixels and the first extraction level in step S1008. For example, if the number of feature points of the reference image is "R" and the first extraction level is "N", the first feature point extraction unit 705 compares the number of feature points R of the reference image and the first extraction level N.

As a result of the comparison, if R<N (the reference image includes the number of feature points smaller than the number N of the first extraction level N), it is determined that the number of the feature points of the reference image is insufficient for the positional alignment processing of a predetermined accuracy (NO in step S1008). Then, pre-processing for extracting the feature points used for the determination of the defective print from the print image is performed and the inspection of the printed product that does not use the positional alignment processing is performed in steps S1019 to S1024. Detailed processing will be described below.

As a result of the comparison, if R>N (the reference image includes a number of feature points equal to or greater than the number N of the first extraction level N), it is determined that the number of the feature points of the reference image is sufficient for the positional alignment processing of a predetermined accuracy (YES in step S1008). Thus, in step S1009, the second feature point extraction unit 706 extracts the feature points of the print image so that the positional alignment processing can be performed.

In step S1010, the second feature point extraction unit 706 determines whether the number of the feature points extracted in step S1009 is sufficient to perform the positional alignment processing of the reference image and the print image. According to the present exemplary embodiment, this is determined by comparing the number of the feature points of the print image extracted in step S1009 and the number of the feature points of the reference image extracted in step S1007, and determining whether an absolute value of the difference between number of feature points of the images is within a predetermined threshold value. Thus, whether the number of the feature points of the print image is within a predetermined range is determined.

If |(number of feature points of print image)−(number of feature points of reference image)|<threshold value (YES in step S1010), it is determined that the number of the feature points of the print image is enough for realizing the required accuracy of the positional alignment, and the positional alignment processing of the reference image and the print image is performed in step S1011. Further, the inspection of the printed product using the image comparison is performed in steps S1012 to 1016.

If |(number of feature points of print image)−(number of feature points of reference image)|≥threshold value (NO in step S1010), it is determined that the number of the feature points of the print image is too many or too small, and the defective determination recording processing is performed in step S1017 since the inspection is NG, and the discharge destination of the printed product is instructed in step S1018.

If the print image has too many feature points, it maybe caused by stained print image due to, for example, toner scattering. Further, if the number of the feature points of the print image is too small, the feature points may have not been extracted due to missing, blur, or density reduction of the print image. In these cases, the print image can be determined as defective before the positional alignment processing and the image comparison processing is performed. In the above-described determination formula, smaller "threshold value" indicates a strict condition for the positional alignment processing in step S1011.

The first extraction level is used as a threshold value for determining the characteristics of the reference image of the feature points, and relates to the accuracy of the positional alignment of the reference image and the print image. This first extraction level is set in step S1006 by the first feature point extraction unit 705. The first extraction level may be a predetermined value or a value input by the user via the UI of the operation unit 207 illustrated in FIG. 15 described below.

Next, the positional alignment of the reference image and the print image performed in step S1011 by the positional alignment unit 707 will be described with reference to FIG. 9. FIG. 9 illustrates edge images of the reference image and the print image. According to the present exemplary embodiment, joined white pixels of a predetermined joined number are considered as a feature point in these edge images. The positional alignment unit 707 performs the positional alignment of the reference image with respect to the print image so that the correlation of the positions of the feature points between the reference image and the print image becomes highest. In other words, the positional alignment is performed so that the feature points of the images overlap as much as possible. As the positional alignment method, a publicly known method such as a method using Fourier transform is used. Further, according to the present exemplary embodiment, although the joined white pixels of the edge image is used as the feature point in the positional alignment, the positional alignment can be performed by using a corner feature point extracted by using Harris operator.

The processing performed by the image comparison unit 708 and the image determination unit 709 in steps S1012 to S1016 after the positional alignment processing performed by the positional alignment unit 707 will now be described in detail with reference to FIG. 10.

The image comparison unit 708 of the present exemplary embodiment compares bitmap pixels of the reference image and the print image, and calculates the difference of each pixel value. According to the present exemplary embodiment, in a case of PDL printing, the reference image is, for example, a bitmap image obtained by rasterizing PDL data. On the other hand, the print image is obtained based on the image data read and acquired by the inspection sensor 403 and corrected by the comparison pre-processing unit 702. The comparison pre-processing unit 702 corrects the image data referring to sensor sensitivity when the image data is read and an illumination condition of the image reading illumination unit 411.

According to the present exemplary embodiment, the reference image and the print image are divided into 25 (=5×5) blocks. Then, the density is compared by the block by the pixel in RGB or CMYK. Whether the comparison is to be performed based on RGB or CMYK can be set according to the image. For example, if the image data is color data, comparison based on RGB is performed. If the image data is monochrome data, the comparison can be performed based on CMYK (only K). Image comparison examples by the block are illustrated in FIGS. 10A to 10D.

Figure 10A:
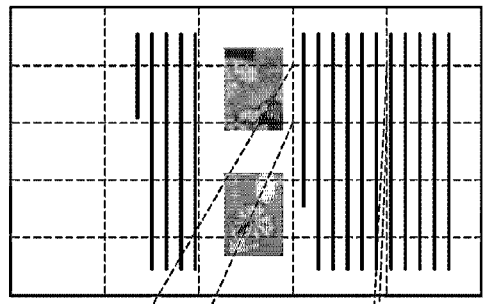
FIGS. 10A, 10B, 10C, and 10D illustrate comparison processing of images.
Figure 10B:
Figure 10C:
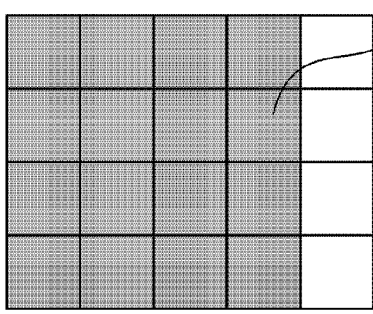
Figure 10D:
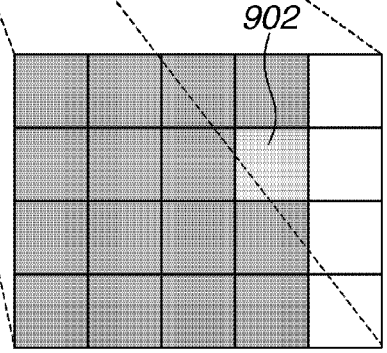

FIG. 10A illustrates a print image. FIG. 10B illustrates one block of the print image after the image has undergone the resolution conversion by the second resolution conversion unit 704 and divided into 5×5 blocks. FIG. 10C illustrates an extraction of a partial image of 4×5 pixels in the reference image. FIG. 10D is a partial image of the print image corresponding to the position of the partial image of the reference image in FIG. 10C. Density data (pixel value) of a pixel is multivalued data (0 to 255).

The image comparison unit 708 compares an absolute value of the comparison value obtained from comparison value=(pixel value of print image)−(pixel value of reference image) and the pixel comparison level. According to the present exemplary embodiment, the pixel comparison level is a threshold value used for determining similarity between the pixel of the print image and the pixel of the reference image.

If |comparison value|≤pixel comparison level, since the pixel of the print image is similar to the pixel of the reference image, the pixel of the print image is determined that it is an OK pixel. In other cases, the pixel of the print image is determined that it has no similarity with the pixel of the reference image, and thus the pixel of the print image is an NG pixel.

According to the example in FIG. 10, although the pixel value of a pixel 902 is originally a blackish value, due to dust attached to the position of the pixel 902, a value of lower density is obtained. In this case, if the value of the comparison level for the determination is set to 40, and if the pixel value of a pixel 901 is 255 and the pixel value of the pixel 902 is 127, since |comparison value|=|127−255|=128>40, the comparison value is greater than the value of the comparison level, and the pixel is determined as an NG pixel.

The image comparison unit 708 performs similar processing on all pixels in each block, and obtains an OK determination ratio (number of OK pixels/number of all pixels in the block) of a pixel in a block unit. Then, the image comparison unit 708 compares the OK determination ratio of this block unit and the block comparison level set in advance. The block comparison level can be stored by the image comparison unit 708 in advance as an image determination ratio but can also be a value set by the user via the operation unit 207.

For example, if the block comparison level is 0.9 and the OK determination ratio is 0.96, since OK determination ratio (0.96)>block comparison level (0.9), the image comparison unit 708 determines that the block is a good block. Then, the image comparison unit 708 performs the inspection determination processing with respect to the whole print image. Subsequently, the image determination unit 709 receives a comparison determination result of all blocks performed by the image comparison unit 708, and determines whether the printed product is OK/NG.

If the determination result indicates that all blocks of the print image are good, it is determined that the printed product is a good product (YES in step S1013), and the processing proceeds to step S1014. If the printed product is determined that it is defective (NO in step S1013), the processing proceeds to step S1015, and the image determination unit 709 performs processing based on the determination result of the printed product.

Next, the inspection processing of the printed product which is performed when the feature points extracted by the first feature point extraction unit 705 does not satisfy the first extraction level will be described. This inspection processing is performed in steps S1019 to S1024.

If the feature points of the reference image extracted by the first feature point extraction unit 705 does not satisfy the first extraction level (i.e., the characteristics of the reference image regarding the feature points are not appropriate for the positional alignment of the predetermined accuracy), the positional alignment is not performed.

According to the present exemplary embodiment, for example, if R<N as a result of the comparison of the number of feature points R of the reference image and the first extraction level N, the first feature point extraction unit 705 determines that the positional alignment of the reference image and the print image cannot be performed with the predetermined accuracy. This is because the information amount of the feature points of the reference image which have been extracted is too small for the positional alignment with the predetermined accuracy.

If the information amount of the feature points of the reference image is too small (NO in step S1008), the second feature point extraction unit 706 performs the extraction processing of the feature points of the print image in steps S1019 and S1020, and compares the number of the extracted feature points of the print image and the number of the feature points of the reference image in step S1021. These steps will be described below in detail.

In step S1019, the second feature point extraction unit 706 sets the information regarding the feature points of the reference image extracted by the feature point extraction processing in step S1007 as the second extraction level. The set second extraction level is used for the processing for determining whether the feature points of the print image have been generated by the defective print in step S1021. Further, the second extraction level is used for determining whether the printed product is defective based on the feature points of the print image.

According to the present exemplary embodiment, the second extraction level is a threshold value used for determining whether the printed product is defective when the number of the feature points of the print image exceeds the number of the feature points of the reference image.

According to the present exemplary embodiment, although the second extraction level is set based on the number of the feature points of the reference image, the second extraction level can be a predetermined value set in advance or a value input by the user via the UI (not illustrated) of the operation unit 207.

Further, in addition to the number of the feature points of the reference image, a degree of dispersion of the feature points of the reference image can be set as the second extraction level.

In step S1020, the second feature point extraction unit 706 extracts the feature points from the print image as is performed in the above-described extraction processing of the feature points.

In step S1021, the second feature point extraction unit 706 determines whether the number of feature points P extracted from the print image is equal to or greater than a second extraction level R which has been set.

As a result of the determination, if P<R (NO in step S1021), it is determined that the printed product is not a defective product, and the processing proceeds to step S1024. If P<R, it is a case where the number of the feature points of the print image is smaller than the number of the feature points of the reference image which is already small. In step S1024, the image determination unit 709 performs the instruction processing of the discharge destination of the printed product.

On the other hand, as a result of the determination, if P>R (YES in step S1021), the number of the feature points of the print image is greater than the number of the feature points of the reference image, and it may be considered that the number of the feature points has increased due to a factor such as toner scattering (see FIG. 11). Thus, the image determination unit 709 determines that the printed product of such a print image is defective, and the processing proceeds to step S1022. In step S1022, the image determination unit 709 performs the defective determination recording processing. In step S1023, the image determination unit 709 performs the instruction of the discharge destination of the printed product.

Figure 11A:
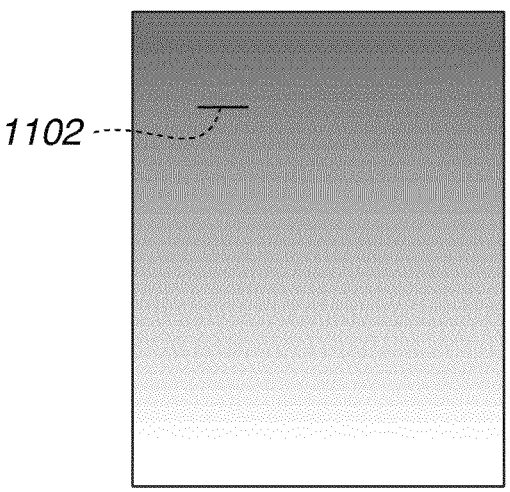
FIGS. 11A and 11B illustrate an extraction result of the feature points.
Figure 11B:
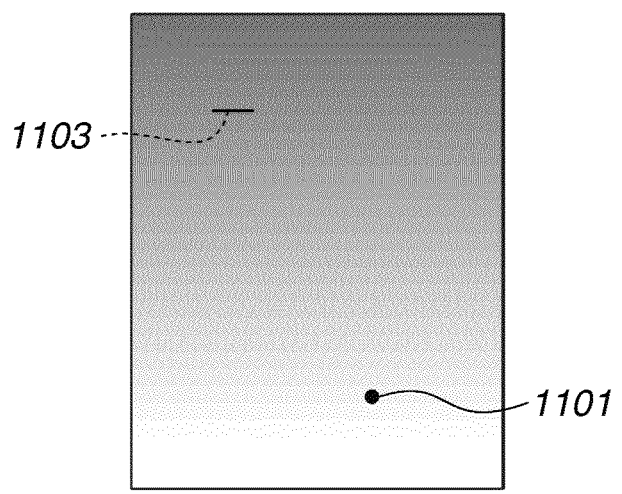

In FIGS. 11A and 11B, a line segment 1102 is extracted as the feature points as a result of the extraction of the feature points of the reference image. Since the feature points of the reference image is only the line segment 1102, it is determined that the number of the feature points of the reference image does not satisfy the first extraction level. Further, a line segment 1103 and a dot 1101 due to defective printing are extracted as the feature points from the print image.

The positions of the feature points of the reference image (the line segment 1102) and the positions of the feature points of the print image (the line segment 1103) are in a correspondence relation, and the line segment 1102 is favorably printed as the line segment 1103. However, there is no corresponding feature point in the reference image for the dot 1101. Thus, the increased number of the feature points corresponding to the dot 1101 indicates defective printing.

In addition to a feature point such as the dot 1101, if the number of the feature points of the print image is greater than the number of the feature points extracted from the reference image, the increased number of the feature points can be considered as caused by the defective printing. For example, if paper dust is attached to a lens of the inspection sensor 403, the dust affects the print image. Further, the defective printing of the printed product may be caused by smear due to, for example, toner scattering.

Thus, if the number of the feature points of the reference image is so small that the positional alignment cannot be performed, whether the print image is defective can be determined based on the number of the feature points extracted from the print image.

Figure 12:
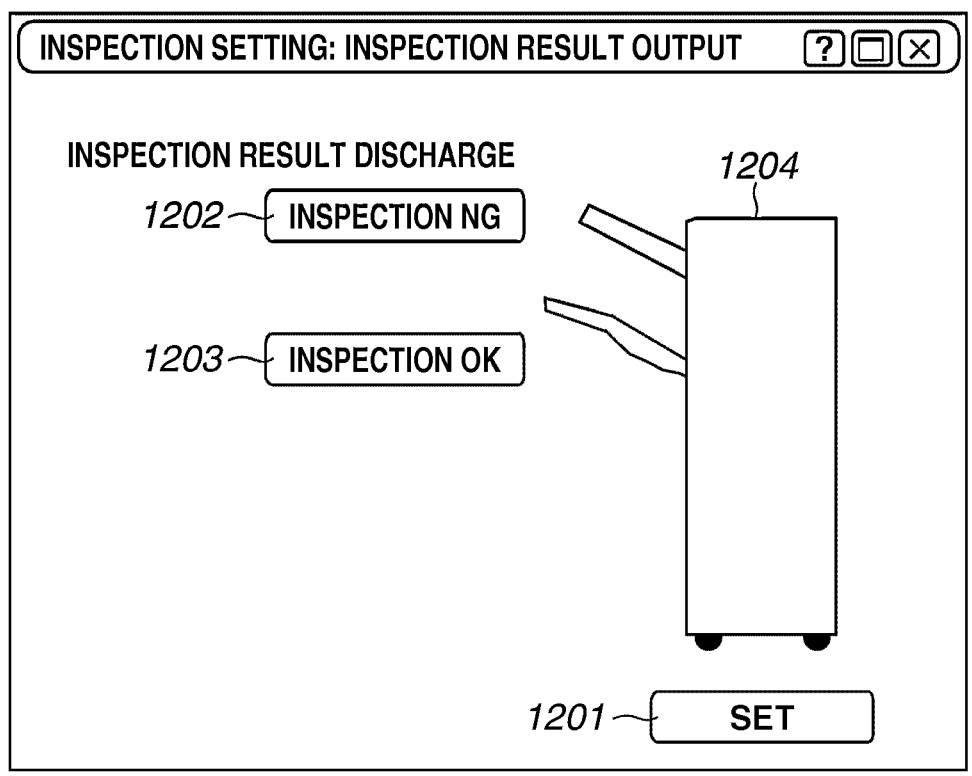
FIG. 12 illustrates a setting example of a discharge destination of a printed product.

UI processing via the operation unit 207 and a display example of the UI when the inspection determination is performed are illustrated in FIG. 12. FIG. 12 illustrates a setting example of a discharge destination of a printed product which has been determined as defective (inspection NG) according to the determination performed by the inspection apparatus 102.

In FIG. 12, an illustration 1204 corresponds to the finisher 103 illustrated in FIG. 5. The setting illustrates an example of a case where a printed product, which has been determined as inspection OK, is discharged on the output tray 502 and a printed product, which has been determined as inspection NG, is discharged on the escape tray 501.

The discharge destination of the printed product is set based on the user instruction set via the UI of the operation unit 207. For example, if the user selects a discharge destination button 1203 on the UI, a pull-down menu (not illustrated) including items such as "inspection OK", "inspection NG", and "inspection OK/NG" is displayed on the UI. Then, the user selects the item corresponding to the printed product to be output on the output tray 502 as the discharge destination.

If the user selects "inspection OK", the setting is made by the inspection processing control unit 700 so that the printed product, which has been determined as inspection OK, is discharged on the output tray 502. If the user selects "inspection NG", the setting is made by the inspection processing control unit 700 so that the printed product, which has been determined as inspection NG, is discharged on the output tray 502. Further, if the user selects "inspection OK/NG", the setting is made by the inspection processing control unit 700 so that the printed product, which has been determined as inspection OK or inspection NG, is discharged on the output tray 502.

If "inspection OK/NG" is selected, the inspection processing control unit 700 grays out a discharge destination button 1202 on the UI. Accordingly, the user is unable to select the discharge destination button 1202. This is the same with a discharge destination button 1203. The inspection processing control unit 700 controls the setting of the discharge destination buttons 1202 and 1203 so that they do not compete against each other.

Further, when the user selects a set button 1201, the inspection processing control unit 700 detects that the button has been selected, and the setting will be accepted. Thus, as described above, the user can separately acquire printed products which maybe defective and printed products which are not defective according to the inspection result.

Figure 13:
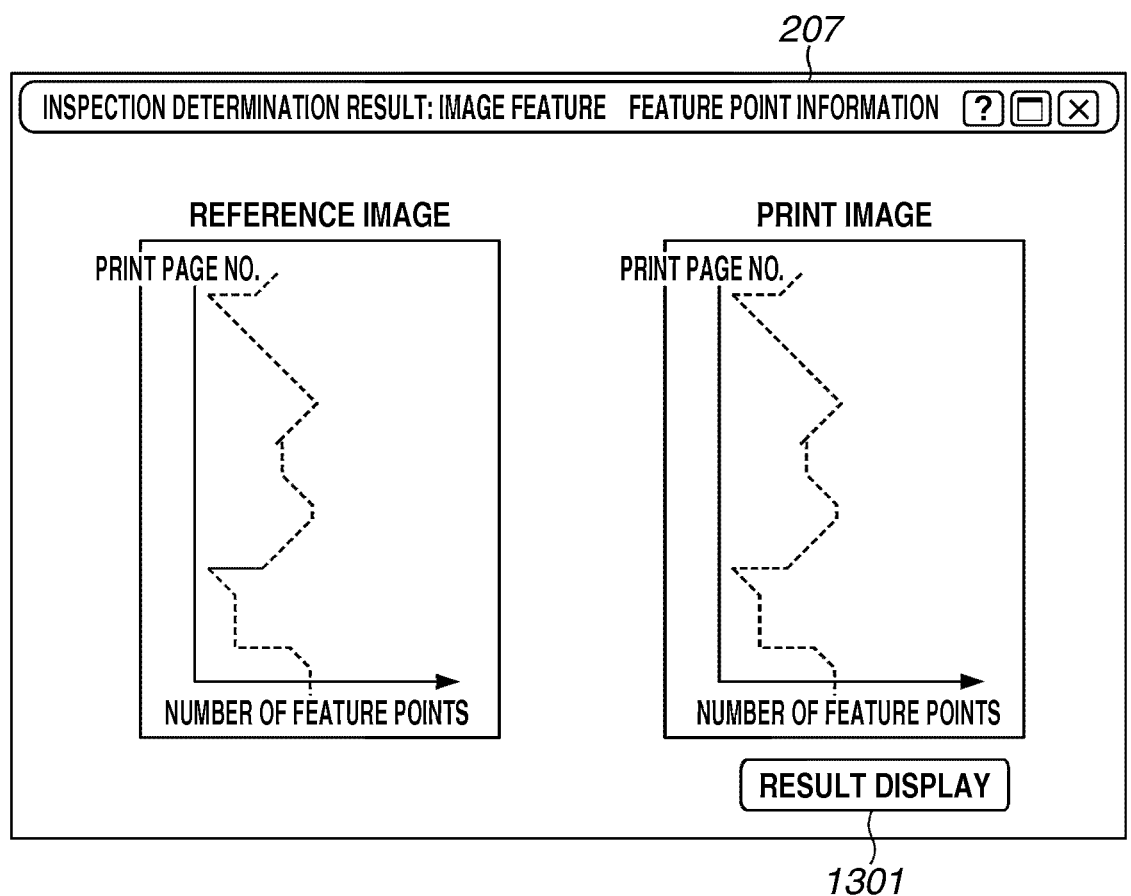
FIG. 13 illustrates a display example of information of the extracted feature points.

FIG. 13 illustrates a display example of a result of the feature point extraction regarding the reference image and the print image performed by the inspection apparatus. The display illustrated in FIG. 13 is controlled so that it is displayed on the operation unit 207 by the inspection processing control unit 700. The user selects a result display button 1301 in advance so that the result of the inspection of the print image is displayed.

If the user selects the result display button 1301, after the inspection result is obtained, the operation unit 207 displays the extraction result of the feature points of the inspection based on the data of the inspection result recorded in the determination result recording unit 710. According to the present exemplary embodiment, the distribution of the feature points of each page of the print image is displayed. Thus, the user can refer to the feature point extraction result as an index indicating the accuracy of the image comparison at the time of inspection. If the number of the extracted feature points is large, the user considers that the determination accuracy of the print image inspection is high.

Figure 14:
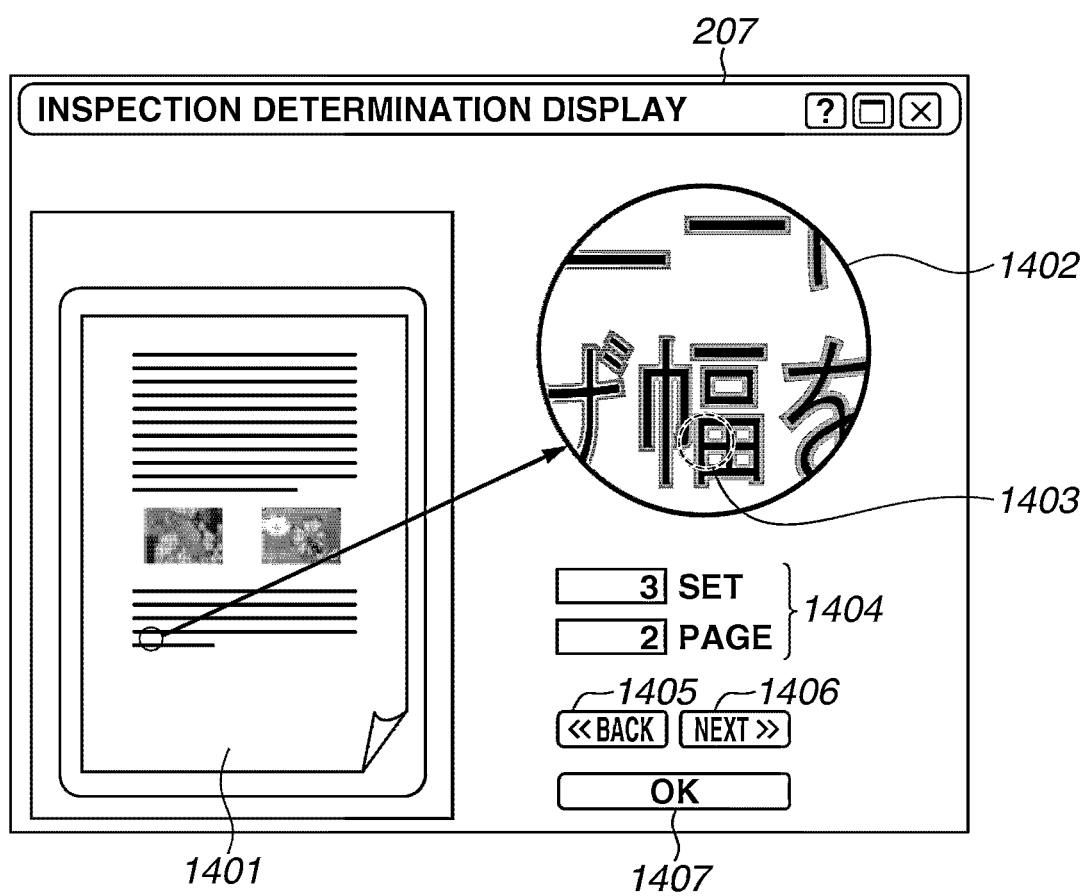
FIG. 14 illustrates a display example of the number of inspection NG pages and a non-corresponding portion of an NG image.

FIG. 14 illustrates a screen of the operation unit 207 displaying the page number of the inspection NG printed product and the non-image-matching portion of the inspection NG printed product. If the user selects a button (not illustrated) for displaying the inspection NG portion on the UI screen displayed by the operation unit 207, the operation unit 207 displays the inspection NG portion on the screen illustrated in FIG. 14.

A thumbnail 1401 is an image of a page selected by the user out of the pages determined as the inspection NG pages. An enlarged image 1402 is an enlarged display of a portion of the thumbnail 1401 where the defect is detected. A portion 1403 indicates the portion where the defect is actually determined in the enlarged image 1402. The portion 1403 is illustrated to describe the present exemplary embodiment, and it is actually not displayed.

Selection fields 1404 are used when the user selects the set number and the page number of the thumbnail 1401. The example in FIG. 14 indicates that the inspection of the second page of the third set of the thumbnail 1401 has been determined as NG. A button 1405 is used for displaying a previous page determined as NG in the inspection. If the user selects the button 1405, for example, a sixth page of a second set is displayed.

A button 1406 is used for displaying a next page determined as NG in the inspection. If the user selects the button 1406, for example, a second page of a fourth set is displayed. A button 1407 is for clearing an "inspection NG detected portion display" illustrated in FIG. 15. If the user selects this button, the display can be changed to a predetermined display.

Figure 15:
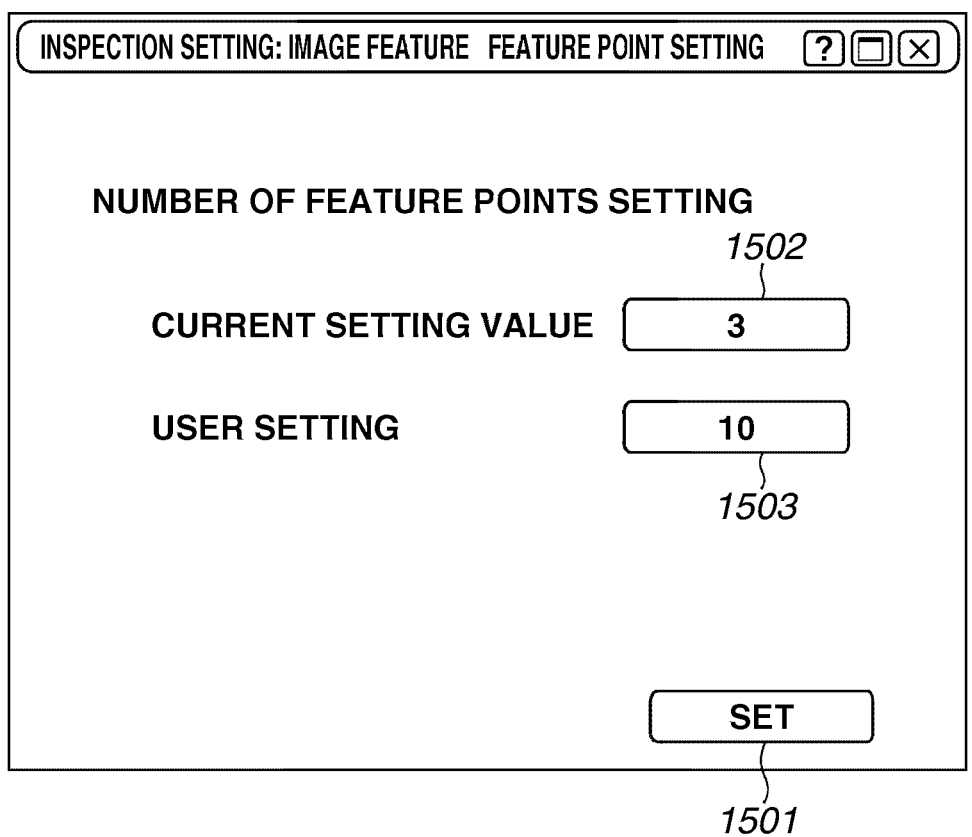
FIG. 15 illustrates a setting example of an extraction level used for extraction of the feature point.

FIG. 15 illustrates an example of the setting set by the user in extracting the feature points necessary in the positional alignment of the reference image and the print image. The number of the feature points set by the user corresponds to the above-described first extraction level.

A value which has been set (value of the setting number) will be used for the number of the feature points necessary in performing the positional alignment. FIG. 15 illustrates an example of the user correcting the value of the setting number via the operation unit 207.

According to the present exemplary embodiment, where the setting value is "3" in a current setting value display field 1502, "10" is set in a user setting input field 1503. Since "10" is set in the user setting input field, the inspection apparatus 102 uses at least 10 feature points for the positional alignment.

If a determination error of the positional alignment processing or lack of accuracy of the positional alignment occurs due to setting of the small number of the feature points, the lower limit number of the feature points necessary in performing the positional alignment is increased by the user via the operation unit 207. In this manner, the accuracy of the positional alignment processing of the reference image and the print image can be enhanced.

Figure 16:
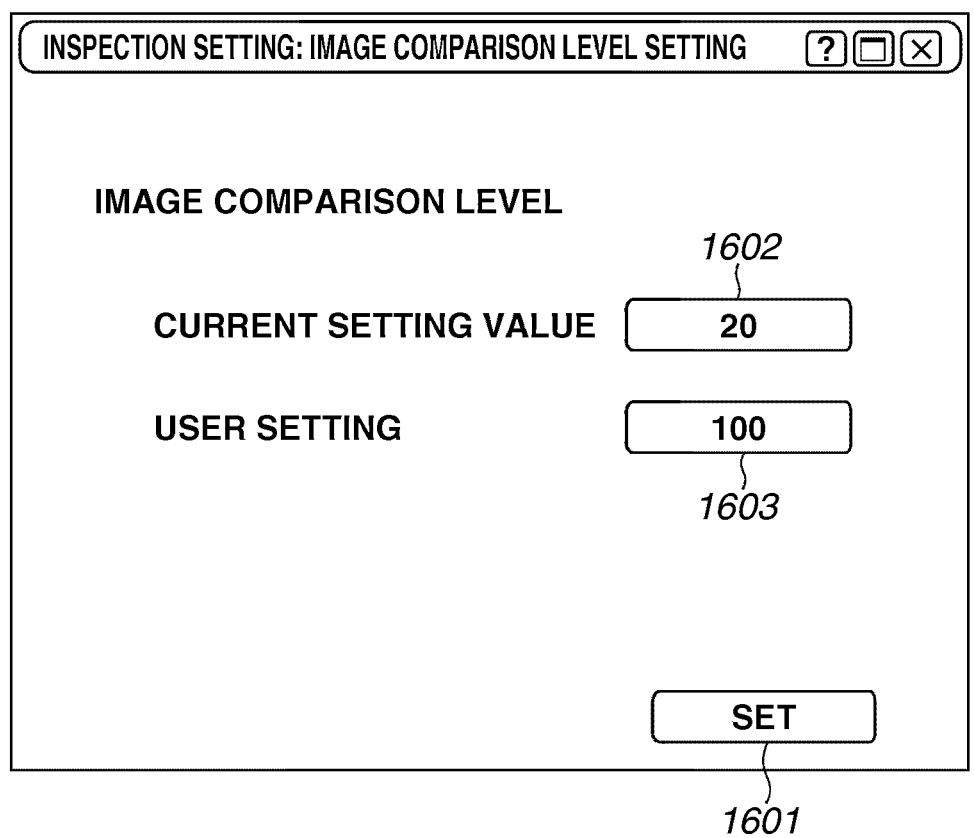
FIG. 16 illustrates a setting example of a comparison level used for comparing the reference image and the print image.

FIG. 16 illustrates an example of the setting of the pixel comparison level used in comparing the reference image and the print image when the images are inspected. According to the present exemplary embodiment, where the setting value of a current setting value display field 1602 is "20", "100" is set in a user setting input field 1603 as the pixel comparison level.

The setting value of the pixel comparison level set by the user is reflected to the pixel comparison level which is used when the pixels of the reference image and the print image are compared by the image comparison unit 708 in the inspection apparatus 102. In this manner, the setting value of the pixel comparison level is set as a threshold value of the density difference of the pixels by the user. The inspection processing control unit 700 detects that the user has selected a set button 1601, and sets the value input in the user setting input field 1603 as the pixel comparison level.

Next, a processing flow of the inspection determination of the present exemplary embodiment will be described. FIG. 17 illustrates the processing flow of the inspection determination executed by each processing unit in the inspection processing control unit 700. In the processing flow described below, although the extraction of the feature points and the image comparison are performed for each block, the extraction and the comparison can be performed for the whole image.

In step S1001, the reference data input unit 701 determines whether the printed product printed by the image forming apparatus 101 is conveyed to the inspection apparatus 102. According to this determination, a print paper detection sensor (not illustrated) in the inspection apparatus 102 detects a printed product output by the image forming apparatus 101 when the printed product is conveyed by the feeding roller 401 to the inspection apparatus 102. Then, the reference data input unit 701 detects the printed product (YES in step S1001), and the processing proceeds to step S1002.

In step S1002, the reference data input unit 701 receives the data of the reference image from the image forming apparatus 101. In step S1003, the comparison pre-processing unit 702 receives the data of the print image read by the inspection sensor 403, and executes the above-described pre-processing. In step S1004, the second resolution conversion unit 704 performs the resolution conversion processing of the print image received in step S1003 so that the resolution of the print image matches the resolution (e.g., 300 dpi) necessary for the image comparison.

In step S1005, the first resolution conversion unit 703 performs the resolution conversion processing of the reference image received in step S1002 in such a manner that the resolution of the reference image matches the resolution (e.g., 300 dpi) necessary for the image comparison. Although it is desirable that the images converted in steps S1004 and S1005 have equal resolutions, they are not necessarily equal. If the resolutions are not equal, sampling of the pixels are performed in the positional alignment processing and the image comparison processing described below.

In step S1006, the first feature point extraction unit 705 sets the first extraction level of the feature points of the received reference image. In step S1007, the first feature point extraction unit 705 extracts the feature points of the reference image. The extraction of the feature points is performed according to the method described above with reference to FIG. 8.

In step S1008, the first feature point extraction unit 705 determines whether the inspection is to be performed using positional alignment of the reference image and the print image based on the characteristics of the reference image regarding the feature points. In other words, whether the feature points of the reference image extracted in step S1007 satisfy the condition to be used in the positional alignment processing performed in step S1011 is determined according to the comparison of the number of the feature points and the first extraction level.

The condition of the feature points used in the positional alignment processing follows the positional alignment accuracy of the positional alignment processing required in step S1011. According to the present exemplary embodiment, the condition is set in step S1006. The first feature point extraction unit 705 determines in step S1008 whether the number of the feature points extracted in step S1007 is equal to or greater than the first extraction level set in step S1006.

The condition used in the positional alignment processing can be a degree of dispersion of the positions of the feature points extracted from the reference image. A different condition can be used so long as the positional alignment accuracy of the image is changed according to the setting of the condition.

If the number of the feature points extracted from the reference image is equal to or greater than the first extraction level (YES in step S1008), it is determined that a necessary number of the feature points in performing the positional alignment processing has been extracted (i.e., the extracted feature points satisfy the condition used in the positional alignment processing), and the processing proceeds to step S1009.

If the number of the extracted feature points is smaller than the first extraction level (NO in step S1008), it is determined that a number of the feature points necessary in performing the positional alignment processing has not been extracted (i.e., the extracted feature points does not satisfy the condition used in the positional alignment processing), and the processing proceeds to step S1019. In other words, according to the determination processing in step S1008 and based on the characteristics of the reference image regarding the feature points, either the inspection processing in and after step S1009 or the inspection processing in and after step S1019 is performed.

For example, if the reference image is a natural picture or a gradation image with a small number of feature points, since the number of the feature points enough for performing the positional alignment with the print image cannot be extracted, the image comparison is performed without the positional alignment. Further, if the reference image includes many characters or lines, since the number of feature points sufficient for the positional alignment can be extracted from the reference image and the print image, the image comparison is performed after the positional alignment of the images.

In step S1009, the second feature point extraction unit 706 performs the extraction of the feature points of the print image. The extraction of the feature points is performed according to the method described above with reference to FIG. 8. In step S1010, the second feature point extraction unit 706 determines whether the feature point extracted in step S1009 satisfies the condition used in the positional alignment processing to be performed in step S1011. According to the present exemplary embodiment, the second feature point extraction unit 706 determines whether the number of the feature points of the print image is large enough.

In step S1011, the positional alignment unit 707 performs the positional alignment processing of the reference image and the print image. The positional alignment is performed according to the method described above with reference to FIG. 9 in such a manner that the positions of the feature points of the reference image and the positions of the feature points of the print image overlap as much as possible. According to the positional alignment, the pixels of the reference image and the pixels of the print image compared in step S1012 are associated with one another. In step S1012, the image comparison unit 708 compares the images which have undergone the positional alignment processing in step S1011.

In step S1013, the image determination unit 709 determines whether the printed product is not defective based on a result of the comparison performed in step S1012. The comparison of the images and the OK/NG determination are performed based on the method described above with reference to FIG. 10. In step S1013, if the printed product is determined as not defective (YES in step S1013), the processing proceeds to step S1014. If the printed product is determined as defective (defective printing) (NO in step S1013), the processing proceeds to step S1015.

In step S1014, the image determination unit 709 instructs the finisher 103 to discharge the printed product onto the output tray 502.

In step S1015, the image determination unit 709 performs the above-described defective determination recording processing. In step S1016, the image determination unit 709 instructs the finisher control unit 601 to set the discharge destination of the printed product based on the setting value of the discharge destination of the printed product which has been determined as defective and set by the operation unit 207. For example, if the discharge destination of the printed product which has been determined as defective is set to the escape tray 501 by the user, the image determination unit 709 instructs the finisher 103 to discharge the printed product onto the escape tray 501.

In step S1017, the image determination unit 709 performs the defective determination recording processing. In step S1018, as is performed in step S1016, according to the setting value of the discharge destination of the sheet which has been determined as inspection NG set in advance by the operation unit 207, the image determination unit 709 instructs the finisher control unit 601 to set the discharge destination of the printed product. The finisher control unit 601 operates so that the printed product is discharged to the discharge destination based on the instruction.

In step S1019, the second feature point extraction unit 706 sets the second extraction level of the feature points of the received print image. In step S1020, the second feature point extraction unit 706 extracts the feature points of the print image. According to this processing, a filter factor of the edge enhancement filter used for extracting the feature points is used as a filter factor considering the value of the processing coefficient of the pre-processing performed by the comparison pre-processing unit 702 when the feature points are extracted.

In step S1021, the second feature point extraction unit 706 determines whether the feature points of the print image extracted in step S1020 are caused by defective printing. According to the present exemplary embodiment, the number of the feature points of the print image extracted in step S1020 and the second extraction level set in step S1019 are compared.

If the number of the feature points extracted from the print image in step S1021 is equal to or larger than the second extraction level (YES in step S1021), the printed product is determined as defective, and the processing proceeds to step S1022. Further, in step S1021, if the number of the feature points extracted from the print image is smaller than the second extraction level (NO in step S1021), the printed product is determined as not defective, and the processing proceeds to step S1024.

Since the processing in steps S1022 and S1023 is similar to processing in steps S1017 and S1018, descriptions of the processing are not repeated.

In step S1024, the image determination unit 709 determines that the feature points enough for the determination of a defective print is not extracted from the print image and transmits an instruction to the finisher 103 to discharge the printed product on the output tray 502.

According to the present exemplary embodiment, for the simplification of the description, the printed product output from the image forming apparatus is a one-sided printed product. However, the printed product can be a two-sided printed product. In such a case, as described with reference to FIG. 4, the inspection sensor 403 can simultaneously read both sides of the printed product, and the inspection apparatus 102 can perform the determination processing of the two-sided image of the printed product in a simultaneous manner or in a time division manner.

Further, the above-described exemplary embodiments can also be achieved by supplying a software (computer program) that realizes each function of aforementioned exemplary embodiments to a system or an apparatus via a network or various types of storage media, and a computer (or a CPU or a MPU) in the system or the apparatus reads and executes the computer program stored in such storage media.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-244175 filed Nov. 8, 2011, which is hereby incorporated by reference herein in its entirety.

What is claimed is:

1. An inspection system including a printing apparatus configured to output a printed product, an inspection apparatus configured to inspect the printed product by comparing a print image acquired by reading the printed product and a reference image, and a discharge apparatus configured to receive the printed product from the inspection apparatus and discharge the printed product, wherein the inspection apparatus includes a determination unit configured to determine whether positional alignment of the reference image and the print image for comparison is to be performed based on a feature of the reference image, an inspection unit configured to execute an inspection based on the comparison of the reference image and the print image after performing the positional alignment in a case where execution of the positional alignment is determined as acceptable by the determination unit, and execute an inspection based on a number of feature points of the print image in a case where the execution of the positional alignment is determined as not acceptable by the determination unit, and a transmission unit configured to transmit information used for controlling the discharge apparatus based on an inspection result of the printed product performed by the inspection unit to the discharge apparatus, wherein the discharge apparatus receives the information transmitted from the transmission unit, and discharges the printed product based on the received information so that the inspection result of the printed product is distinguishable.

2. An inspection apparatus configured to inspect a printed product by comparing a print image acquired by reading the printed product and a reference image, the apparatus comprising:

a determination unit configured to determine whether positional alignment of the reference image and the print image for comparison is to be performed based on a feature of the reference image, and an inspection unit configured to execute an inspection based on comparison of the reference image and the print image after performing the positional alignment in a case where execution of the positional alignment is determined as acceptable by the determination unit and execute an inspection based on a number of feature points of the print image in a case where the execution of the positional alignment is determined as not acceptable by the determination unit.

3. The inspection apparatus according to claim 2, wherein the determination unit includes an extraction unit configured to extract a feature point used for the positional alignment from the reference image and the print image, and a positional alignment determination unit configured to determine whether the positional alignment of the reference image and the print image is to be performed based on a number of feature points of the reference image extracted by the extraction unit.

4. The inspection apparatus according to claim 3, wherein in a case where the execution of the positional alignment is determined as acceptable by the positional alignment determination unit, the inspection unit performs the positional alignment using the feature points extracted from the reference image and the print image and executes the inspection based on comparison by comparing pixel values of the reference image and the print image, wherein in a case where the execution of the positional alignment is determined as not acceptable by the positional alignment determination unit, the inspection unit executes the inspection based on the number of feature points by comparing a number of the feature points of the reference image and a number of the feature points of the print image extracted by the extraction unit without performing the positional alignment.

5. The inspection apparatus according to claim 3, wherein the extraction unit extracts the feature point from the print image in a case where the execution of the positional alignment is determined as acceptable by the positional alignment determination unit, wherein the positional alignment determination unit determines, based on the feature point of the extracted print image, whether the print image is appropriate for executing the positional alignment, and wherein the inspection unit executes, in a case where the print image is determined as appropriate for executing the positional alignment, the inspection based on comparison of the reference image and the print image after performing the positional alignment.

6. The inspection apparatus according to claim 3, wherein the extraction unit extracts edge joined pixels having joined numbers of a predetermined number or more extracted from the reference image and the print image as a feature point.

7. The inspection apparatus according to claim 3, wherein in a case where the reference image includes the feature points of a predetermined number or more, the positional alignment determination unit determines that the execution of the positional alignment is acceptable, and wherein in a case where the reference image includes the feature points less than the predetermined number, the positional alignment determination unit determines that the execution of the positional alignment is not acceptable.

8. The inspection apparatus according to claim 7, wherein in a case where the execution of the positional alignment is determined as not acceptable by the positional alignment determination unit, the inspection unit executes the inspection of the printed product based on whether the number of the feature points extracted from the print image is in a range which is set based on the number of the feature points extracted from the reference image.

9. The inspection apparatus according to claim 7, further comprising a setting unit configured to set the predetermined number based on a user instruction.

10. The inspection apparatus according to claim 3, further comprising a notification unit configured to notify information of the feature point extracted from the reference image and the print image to the user.

11. The inspection apparatus according to claim 2, wherein the inspection apparatus is connected to a post-processing apparatus configured to discharge the printed product which has undergone print processing to one of a plurality of discharge destinations, and further comprising a setting unit configured to set the discharge destination of the printed product, which has been determined as defective by the inspection unit, based on a user instruction.

12. The inspection apparatus according to claim 2, wherein the inspection apparatus is connected to a printing apparatus configured to output the printed product, and further comprising a transmission unit configure to transmit, in a case where a cumulative number of the printed products determined as defective by the inspection unit is equal to or greater than a predetermined number, information to stop the print processing to the printing apparatus.

13. An inspection method for inspecting a printed product by comparing a print image acquired by reading the printed product and a reference image, the method comprising:

determining whether positional alignment of the reference image and the print image for comparison is to be performed based on a feature of the reference image, and executing an inspection based on the comparison of the reference image and the print image after performing the positional alignment in a case where execution of the positional alignment is determined as acceptable, and executing an inspection based on a number of feature points of the print image in a case where the execution of the positional alignment is determined as not acceptable.

14. A non-transitory computer-readable storage medium storing a computer-executable program causing one or more microprocessors to execute the inspection method according to claim 13.

* * * * *